(12) United States Patent
Thurneysen et al.

(10) Patent No.: US 8,303,238 B2
(45) Date of Patent: Nov. 6, 2012

(54) KINEMATIC DEVICE FOR SUPPORTING AND PROGRAMMABLY MOVING A TERMINAL ELEMENT IN A MACHINE OR AN INSTRUMENT

(75) Inventors: Markus Thurneysen, Jouxtens-Mézery (CH); Reymond Clavel, Oulens/Echallens (CH)

(73) Assignee: Willemin Machines S.A., Bassecourt (CH)

( * ) Notice: Subject to any disclaimer, the term of this patent is extended or adjusted under 35 U.S.C. 154(b) by 931 days.

(21) Appl. No.: 10/648,730

(22) Filed: Aug. 22, 2003

(65) Prior Publication Data
US 2004/0052628 A1    Mar. 18, 2004

Related U.S. Application Data

(63) Continuation-in-part of application No. PCT/CH02/00100, filed on Feb. 21, 2002.

(30) Foreign Application Priority Data

Feb. 23, 2001    (EP) ..................................... 01810193

(51) Int. Cl.
    *B25J 17/02*    (2006.01)
(52) U.S. Cl. ..................... 414/680; 74/490.06; 414/735; 901/29
(58) Field of Classification Search .................. 414/680, 414/735; 901/15, 23, 28, 29; 74/490.01, 74/490.03, 490.06
See application file for complete search history.

(56) References Cited

U.S. PATENT DOCUMENTS

| | | | |
|---|---|---|---|
| 4,976,582 A | 12/1990 | Clavel | |
| 5,378,282 A | 1/1995 | Pollard | |
| 5,901,936 A | 5/1999 | Bieg | |
| 6,095,011 A | 8/2000 | Brogaardh | |
| 6,099,217 A * | 8/2000 | Wiegand et al. | 74/490.03 X |
| 6,325,591 B1 * | 12/2001 | Focke et al. | 414/749.1 |
| 6,497,548 B1 * | 12/2002 | Roy et al. | 414/735 |

FOREIGN PATENT DOCUMENTS

| | | |
|---|---|---|
| DE | 19525482 A1 | 1/1997 |
| DE | 19611130 A1 | 9/1997 |
| DE | 19710171 A1 | 9/1998 |
| DE | 19839366 A1 | 3/2000 |
| GB | 2295601 A | 6/1996 |
| WO | WO 97/22436 | 6/1997 |
| WO | WO 99/08832 | 2/1999 |
| WO | WO 99/32256 | 7/1999 |

* cited by examiner

*Primary Examiner* — Donald Underwood
(74) *Attorney, Agent, or Firm* — Clifford W. Browning; Krieg DeVault LLP

(57) ABSTRACT

The invention concerns a kinematic device for supporting and programmably moving a terminal element. The platform (11) bearing the terminal element (12) is linked by four swivel joints (9) and (10) with two legs each consisting of two support rods (7) or (8) forming deformable parallelograms mounted each on slides (3) or (4) mobile in the x direction. The pivot plate (29) articulated on the platform (11) about the hinge pin (30) is controlled by the control rods (27), controlling pivoting (14) and lateral displacement (18) connected respectively by the swivel joints (26, 13 and 17) to the slides (3, 12 and 26). It consists in a parallel kinematics with four degrees of freedom, namely three translational and one rotational whereof the angle can be greater than 120°.

2 Claims, 12 Drawing Sheets

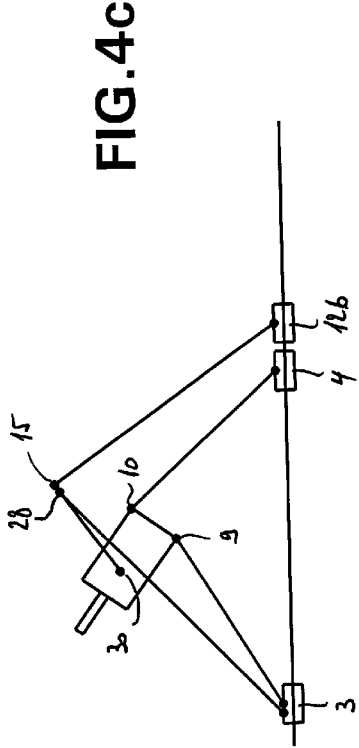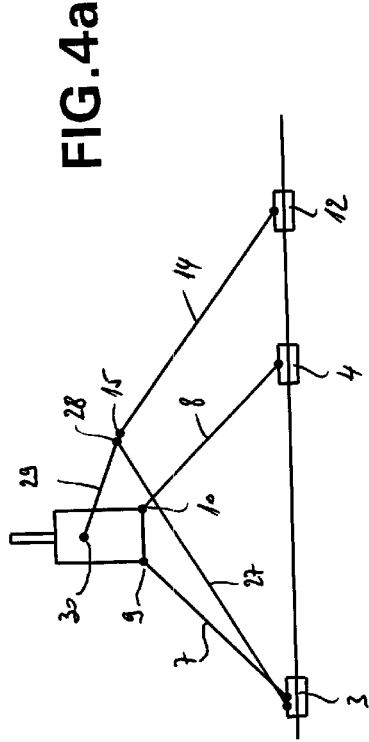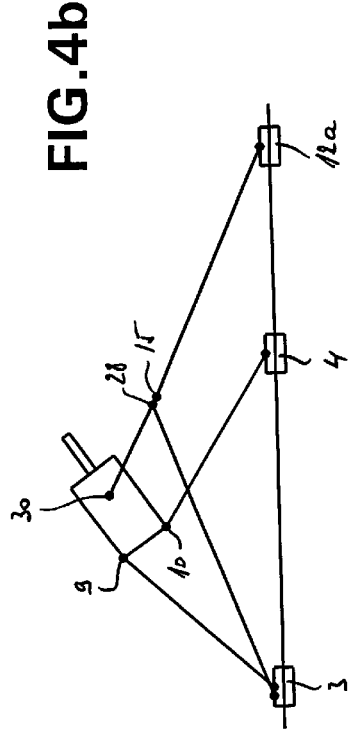

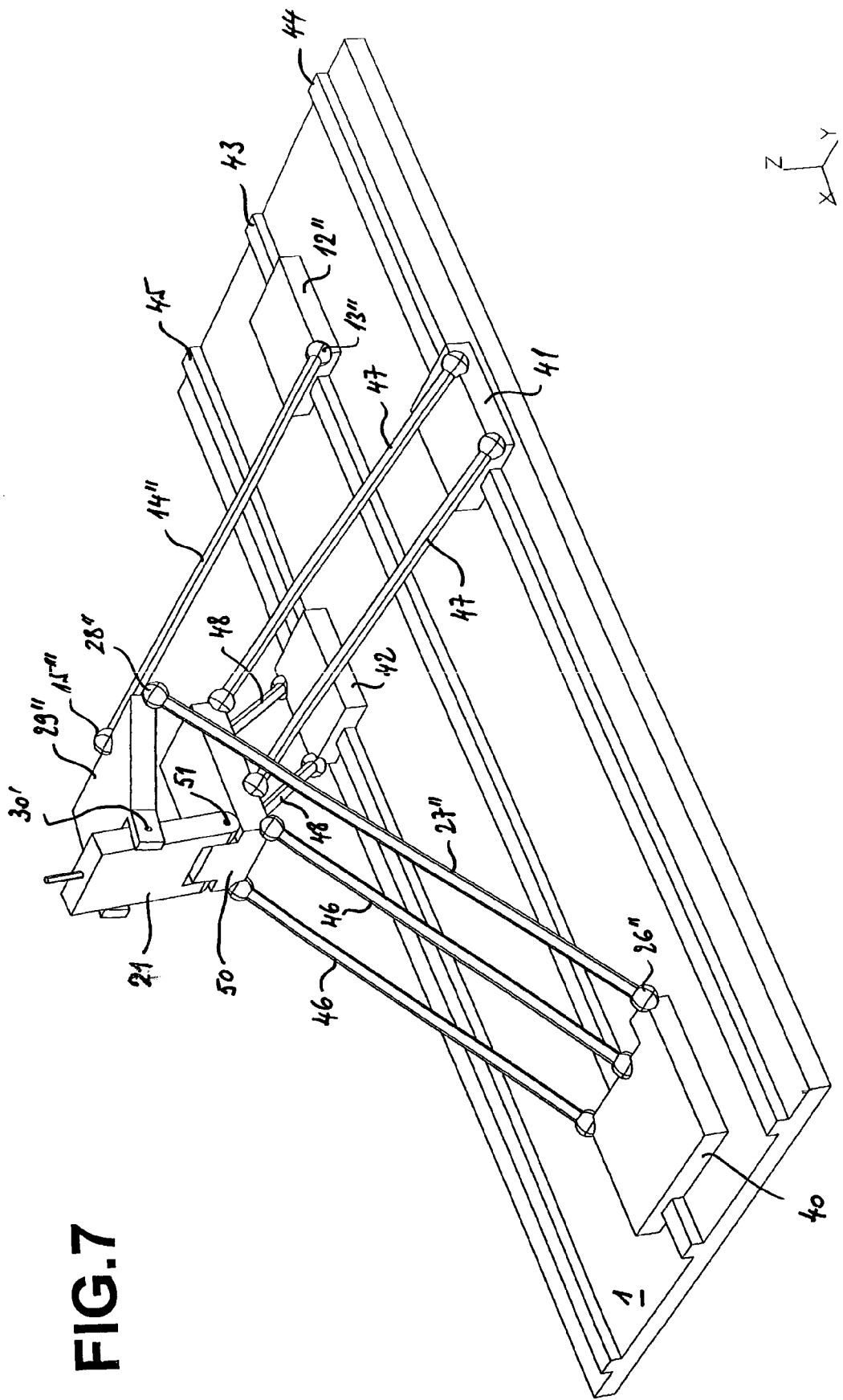

KINEMATIC DEVICE FOR SUPPORTING AND PROGRAMMABLY MOVING A TERMINAL ELEMENT IN A MACHINE OR AN INSTRUMENT

This application is a continuation in part of International patent application Serial No. PCT/CH 02/00100 filed Feb. 21, 2002.

The present invention relates to the technical field of kinematic devices for supporting and moving a terminal element in translation and/or in rotation in programmable and high-precision controlled manner within a predetermined workspace.

The terminal element may be a machining tool (spindle, laser, water jet, electro-erosion tool, etc.) or a workpiece carrier when the device is incorporated into a machining center, for example, or a gripper tool, an assembly tool, a measurement sensor, a user interface for a force-return joystick, an antenna, a camera holder, etc. in transfer machines, in assembly robots, in packaging machines, in measurement instruments, and in medical instruments etc., or any device in which high-precision positioning or movement and/or high dynamics are necessary.

In this field, numerous applications exist that require a gripper whose angular positioning can be controlled about an axis that is parallel to the base. This applies, for example, for machining complex workpieces or for polishing workpieces of high aesthetic quality.

In particular, for producing small complex workpieces at high throughputs, it is necessary to have machines that are capable not only of high machining speeds, but also of very fast tool changes in order to minimize the chip-to-chip time.

By means of their high dynamics (low moving mass and high stiffness), parallel kinematics machine tools can satisfy those two constraints.

However, the main drawbacks of the parallel machine tools and robots that exist on the market lie in their relatively small working volume and in very restricted angular mobility.

A very high performance structure which applies more specifically to moving a terminal element such as a gripper member, for example, is described in European patent EP 0250470 and in U.S. Pat. No. 4,976,582. In that structure, the three basic degrees of freedom are controlled in parallel using actuators disposed on a fixed support, while retaining the parallelism of the moving element relative to the fixed support. In view of its high dynamics and of its mobility in translation in three dimensions, such a structure is particularly well suited to transferring lightweight workpieces at high transfer rates (over three transfers per second). The originality of that structure lies in all of the angular positioning movements of the gripper being locked by the kinematic configuration. Unfortunately, such a device does not make it possible per se to satisfy applications in which one or more rotations are required.

In addition, International patent applications WO 98/51443 and WO 99/32256 are known that relate to parallel kinematic control of tools such as milling cutters in machine tools designed for manufacturing delicate workpieces, and in particular turbine blades. Unfortunately, the devices described in those documents make it possible to achieve only angular movements of the tool that are quite small (about ±30°) if good rigidity of the structure is to be conserved.

An object of the present invention is to provide a parallel kinematics device that satisfies the above-indicated needs better and more comprehensively than known devices, and that offers, in particular, speed and working precision that are as high as possible while making it possible to program movements of the terminal element in a workspace whose volume is as large as possible, and guaranteeing uniform behavior within said working volume.

To this end, the present invention provides a kinematic device for supporting and programmably moving a terminal element in a machine or an instrument including a fixed base defining a reference plane, said device comprising a support and drive structure with at least two rigid legs connected via respective ends to members guided so that each of them moves with only one degree of freedom relative to the base, and via respective other ends to a platform itself connected to said terminal element, the connections between the legs and the platform and between the legs and the guided members being joints, and the movement of said guided members making it possible to move said platform at will within a predetermined workspace, wherein in order to enable the terminal element to pivot about an axis belonging to the platform, the support and drive structure includes an auxiliary structure organized to transmit to the terminal element a resultant force that determines a rotation of the terminal element about said axis in response to one or more coordinated movements of one or more auxiliary guided members, each of which moves with one degree of freedom relative to the base, and wherein said auxiliary structure comprises at least one articulated system which is made up of a rigid drive element connected at one of its ends via a joint to an auxiliary member guided so as to move with one degree of freedom relative to the base, and of a portion of said auxiliary structure transmitting said resultant force to the terminal element, the geometrical configuration of the transmission portion being such that regardless of the position of the terminal element the property of "angular stiffness tracking" (as defined hereinafter) is fulfilled throughout the workspace.

Said portion of the auxiliary structure that transmits the pivot force to the terminal element may comprise a pivot plate hinged to the terminal element about an axis parallel to said axis associated with the platform, and a control bar hinged at one of its ends to the pivot plate via an intermediate joint and at its other end to a guided member for supporting one of the legs of the support and drive structure, the rigid drive element thus acting on the pivot plate while the control bar controls the direction of the resultant force.

In one embodiment, the terminal element and the platform are two members that are secured together, and the axis associated with the platform is determined by the locations of the joints via which the legs are hinged to the platform.

In another embodiment, the terminal element and the platform are two distinct members associated with each other via a joint, the platform being mounted on the base so that said guided members constrain it to move in translation only, and said axis associated with the platform being the axis of the joint via which the terminal element is hinged to the platform.

In another embodiment, the terminal element and the platform form a single composite member in two portions that are secured to each other, the axis associated with the platform being determined by the locations of the joints via which the legs are hinged to the platform, and wherein said transmission portion of the auxiliary structure includes an element which projects laterally relative to said composite member and on which a joint is placed between the rigid drive element and the terminal element, the joint determining the point of application of said resultant force applied by the rigid drive element to said transmission portion, and the geometrical shape of said transmission determining the conditions under which the forces are applied.

In another embodiment, the terminal element and the platform form a single composite member in two portions that are secured together, wherein said transmission portion of the auxiliary structure is constituted merely by a joint between the rigid drive member and the terminal element, determining the location of the point of application of said resultant force applied by the rigid drive element to said transmission portion, and wherein the one or more guided members of the auxiliary structure are mounted on the base so as to steer the rigid drive element along a line such that the location of the point of application on the terminal element constrains the resultant force to have a direction perpendicular to the line connecting said location of the joint to the axis associated with the platform.

Said support and drive structure may comprise means actuated by at least one auxiliary guided member mounted to move with one degree of freedom relative to the base so as to move the platform in a direction parallel to said pivot axis associated with the platform, said means being combined with said auxiliary structure.

At least some of the joints may be ball and socket joints, and said support and drive structure may be organized such as to enable the terminal element to move in three dimensions, the workspace extending to a volume determined by the amplitude of the movements of said guided members.

In variants, at least three of the working joints may be pivot joints, the pivot axes being mutually parallel, and the workspace may be limited to an area contained in a plane perpendicular to said reference plane and to the pivot axes; it being possible for the machine or the instrument to include a support suitable for being moved along an axis parallel to the pivot axes and serving to receive a workpiece on which the terminal element acts.

Various embodiments of the device of the invention are described below with reference to the accompanying diagrammatic drawings, in which:

FIGS. 4, 4a, 4b and 4c are elevation views of a variant of the second embodiment;

FIG. 7 is an overall perspective view of a fourth embodiment;

In the present description, the term "working joint" is used to designate a joint that is necessary for operation of the device to which it is attached, unlike joints that allow internal mobility, e.g. a bar equipped with two ball and socket joints at its ends and that can turn about its own axis, which does not provide any functionality.

The figures diagrammatically show support and drive devices that are suitable for being used in a machine tool, an instrument, or a robot, or else in some other type of work machine, such as, for example, an assembly machine. In a machine for transferring workpieces, the terminal element may be a claw or a suction cup, or some other type of gripper member. In a machine tool, the terminal element may be either a spindle carrying a milling cutter, a milling wheel, a drill bit, a workpiece-carrier, etc. or else a water jet device, a laser cutter device, an electro-erosion device, a de-burring device, a sand blaster, a painting device, a polishing device, etc. The machine may be equipped with grippers and with machining tools on board the terminal element, e.g. mounted on a revolver head, or associated with an active or passive tool changer (i.e. a stock of tools and/or of workpiece carriers).

In the embodiments described below, in order to improve understanding of the figures, the terminal element is shown symbolically by a motor body which is associated rigidly with a rigid part referred to as a "platform", the platform being part of the support and drive structure. However, as described below, cases are encountered in which the terminal element is mounted on the platform via a device for pivoting about an axis associated with the platform.

Each of the devices described has a reference base 1 which, in most cases, remains fixed. The base is generally embodied by one or more plane surfaces connected to the bed of the machine, but naturally the base surface(s) may also be curved. However, it is essential for the consistency of the description for the surfaces to define a Cartesian reference frame on the basis of which the axis x, y, and z of the workspace are determined. Below, it is considered that the axes x and y of the Cartesian reference frame are defined in the plane of the base of the device, and that the axis y is parallel to the axis of rotation of the platform.

Figure 1:
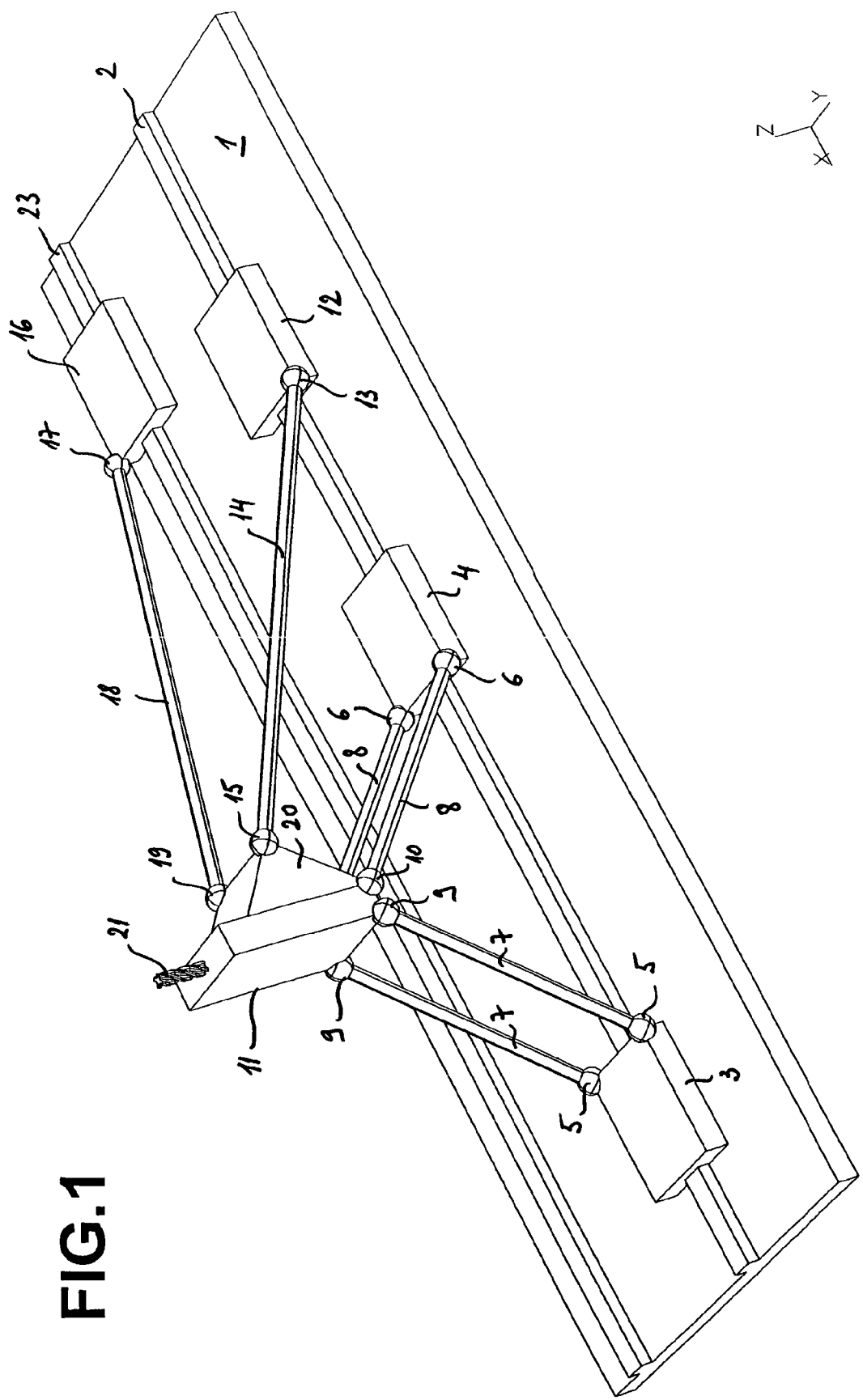
FIG. 1 is an overall perspective view of a first embodiment of the device.
Figure 2:
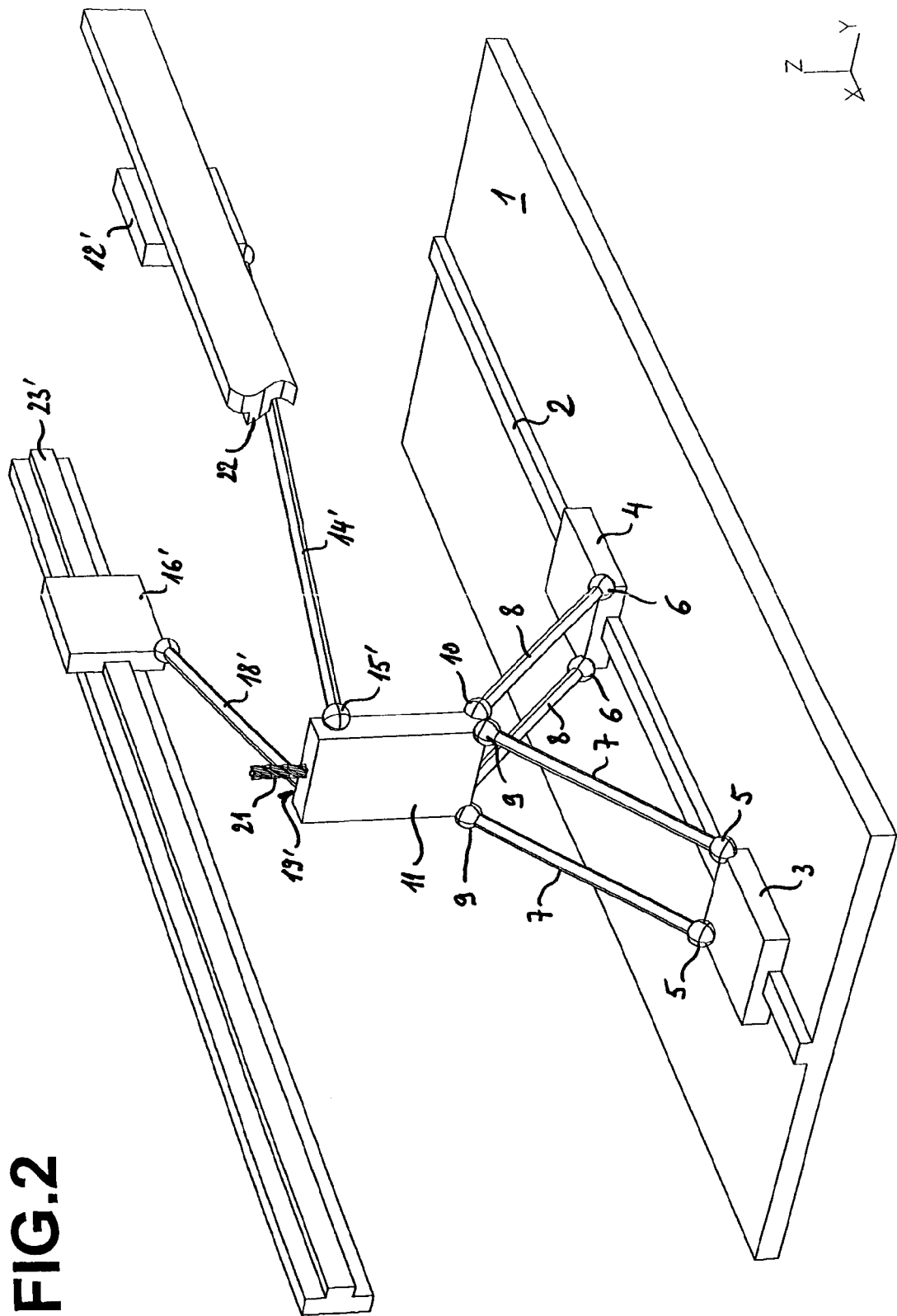
FIG. 2 is an overall perspective view of a first variant of the first embodiment.

The devices shown diagrammatically in FIGS. 1 and 2 are simplified devices, in which the number of the elements of the structure is reduced. The workspace that can be traveled by the terminal element is not as large as, for example, what can be achieved by the device of FIG. 3, with the other dimensions remaining equal, but the reduction in the weight of the moving elements obtained by simplifying the structure opens up possibilities of specific uses for them, e.g. for applications in which precision is of prime importance.

In the surface of the plane base 1 of the device shown in FIG. 1 a prismatic guide 2 is provided that is rectilinear, that has one degree of freedom in translation, and that defines an axis that, by convention, is referred to as the "x-axis". Two motor-driven slides 3 and 4 are mounted on the guide 2 so that movement of the slides is controlled in a manner enabling them to be moved independently from each other along the x axis. At each of its ends, i.e. on a line which remains substantially perpendicular to x, each of the slides 3 and 4 carries two ball and socket joints 5, 6 which serve as abutments and joints on the slide for receiving pairs of rigid support bars 7, 8, the top ends of the pairs of support bars in turn carrying respective pairs of ball and socket joints 9, 10, hinging a platform 11 to the two legs formed by the pairs of bars 7 and 8. The two bars of each pair 7 or 8 are preferably parallel. The platform 11 is shown in this example by a rectangular block whose rectangular bottom surface carries one of the ball and socket joints 9, 10 at each of its corners. The ball and socket joints 9 or 10 may also be situated at any place within the rectangular block shaped volume of the platform 11, provided however that the two ball and socket joints 9, 10 in each pair are placed on a straight line that is parallel to the axis of rotation of the platform 11. The platform 11 is fixed rigidly to the body of a terminal element (active or passive element) 21, e.g. a spindle carrying a milling cutter or some other rotary tool and whose axis of rotation may be angularly positioned in any way relative to the platform.

The device further includes an auxiliary structure which controls the two residual degrees of freedom of the platform, and thus of the terminal element 21. This structure comprises firstly a pivot bar 14 serving to drive the pivoting of the platform, and secondly a side bar 18 serving to control the degree of freedom of the platform along the y-axis.

The pivot bar 14 is hinged at one of its ends via a ball and socket joint 13 to a motor-driven slide 12 organized to move along the prismatic guide 2, outside the area over which the slides 3 and 4 for driving the legs 7 and 8 can travel. It is hinged at its other end via a ball and socket joint 15 to the end of an element 20 secured to the platform 11 and projecting laterally relative thereto. This configuration makes it possible to conserve, throughout the workspace, an angle that is very close to the normal between the direction of the force acting on the terminal element to cause it to pivot under the action of the slide 12 and the straight line passing through the ball and socket joints 10 and 15. This property is referred to in the remainder of the description as "angular stiffness tracking" of the pivot drive, and it makes it possible to achieve performance levels that are significantly higher in terms of angular strokes and of rigidity than those achieved by prior devices.

In other terms, the geometrical configuration of the transmission portion is such that, regardless of the position of the terminal element within the predetermined workspace, the resultant force is applied by the rigid drive element (14) to the transmission portion at a point of application (15), and a projection of said resultant force in a plane perpendicular to the axis associated with the platform has, at said point of application, a direction such that the working element is subjected to a usable moment throughout the workspace.

Figure 3:
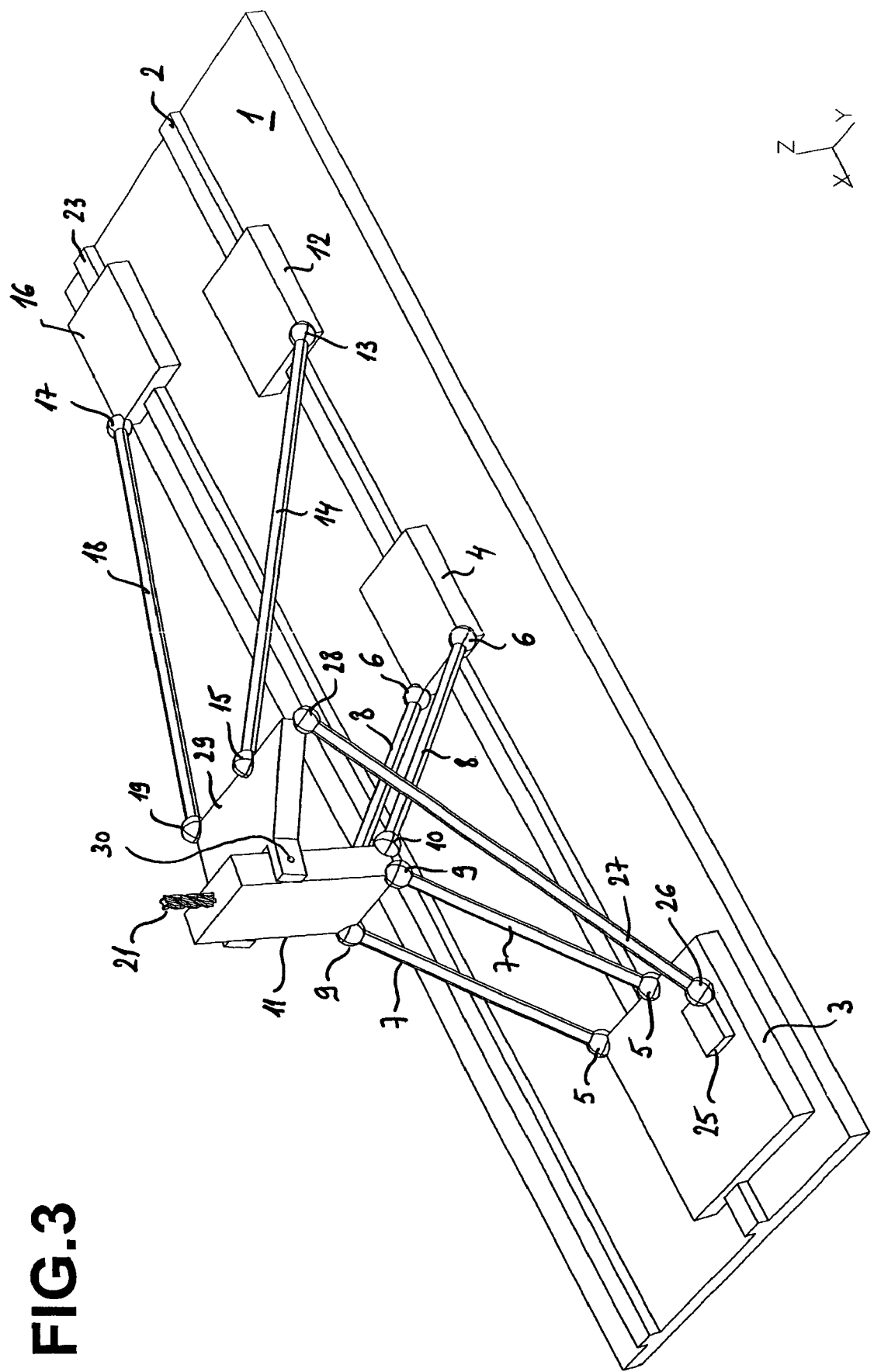
FIG. 3 is an overall perspective view of a second embodiment.

By way of example, in order to keep the torque guaranteeing the angular positioning of the platform 11 constant over an angular movement of 120°, the second embodiment shown in FIG. 3 makes it possible, by means of the "angular stiffness tracking" property of the device of the invention, to obtain a variation in the component of the resultant force acting in the pivot plate 29 and perpendicular to the axis 30 of only 15% relative to its minimum value, for reasonable dimensions for the device.

Results of the same order of magnitude can be obtained with the other embodiments described in the present application.

Because of the ball and socket joints, and despite the fact that the ball and socket joint 13 is placed on a corner of the slide 12 that is itself placed in a position that is symmetrical about the guide 2, the configuration described does not control the degree of freedom along the y-axis of the device. This control is obtained by the side bar 18 which is hinged at one of its ends via a ball and socket joint 17 to a motor-driven slide 16 organized to move along a prismatic guide 23, that is rectilinear and that has one degree of freedom in translation, parallel to the guide 2 and also disposed in the surface of the base 1. The bar 18 is hinged at its other end via a ball and socket joint 19 to the element 20. It should be specified that the ball and socket joint 19 does not necessarily have to be mounted on the element 20, but rather it could also be mounted on the platform 11 or on the terminal element 21.

This configuration is sufficient to provide full control over the positioning of the terminal element 21 throughout the workspace.

It can be understood that the slides may be designed as trucks driven by a motor whose drive member meshes with a fixed rack, or by a ball screw, or by a chain traction system, or else by a linear motor or some other means. Each of the ball and socket joints 5, 6, 9, 10, 13, 15, 17, and 19 hinges a bar to the portion that carries it or to the portion that it carries about any axis with an amplitude that depends on its construction. The ball and socket joints may be of the universal joint type.

It can be understood that the device of FIG. 1 may be constructed in a manner such as to position and to control the positioning of the terminal element 21 exactly not only at any point within a predetermined workspace xyz but also with a predetermined angular positioning for the axis of the terminal element about a pivot axis that is parallel to the y-axis. In the absence of the auxiliary structure 12 to 20, the assembly comprising the platform 11 and the terminal element 21 is supported by the legs 7, 8, and, for each position of the slides 3, 4, there remain two degrees of freedom for it: movement over a circular arc in the plane yz by deforming the parallelograms 7, 8 and rotation about an instantaneous axis of rotation parallel to the y-axis and corresponding to the intersection between the planes formed respectively by the axes of the legs 7 and by the axes of the legs 8. These two degrees of freedom are controlled exactly by the relative positions of the slides 12 and 16 along the prismatic guides 2, 23. The positions of the prismatic guides and the lengths of the pivot bar 14 and of the side bar 18 determine fully the workspace that the terminal element 21 can reach.

In the example shown in FIG. 1, the guides 2 and 23 are parallel guides, but naturally they may also be disposed in any direction of the space or they may be curved. Similarly, the slides 3, 4, and 12 could move along separate guides. In addition, the rectilinear prismatic guides could be replaced by pivotally mounted levers having one degree of freedom: thus, for example, the slides 3 and 4 could be replaced with two levers having pivot axes parallel to y. The slides 12 and 16 may be replaced with levers having pivot axes positioned in any way. The levers may optionally be motor-driven. The above remarks also apply to all of the other embodiments and variants that are described below.

Figure 10:
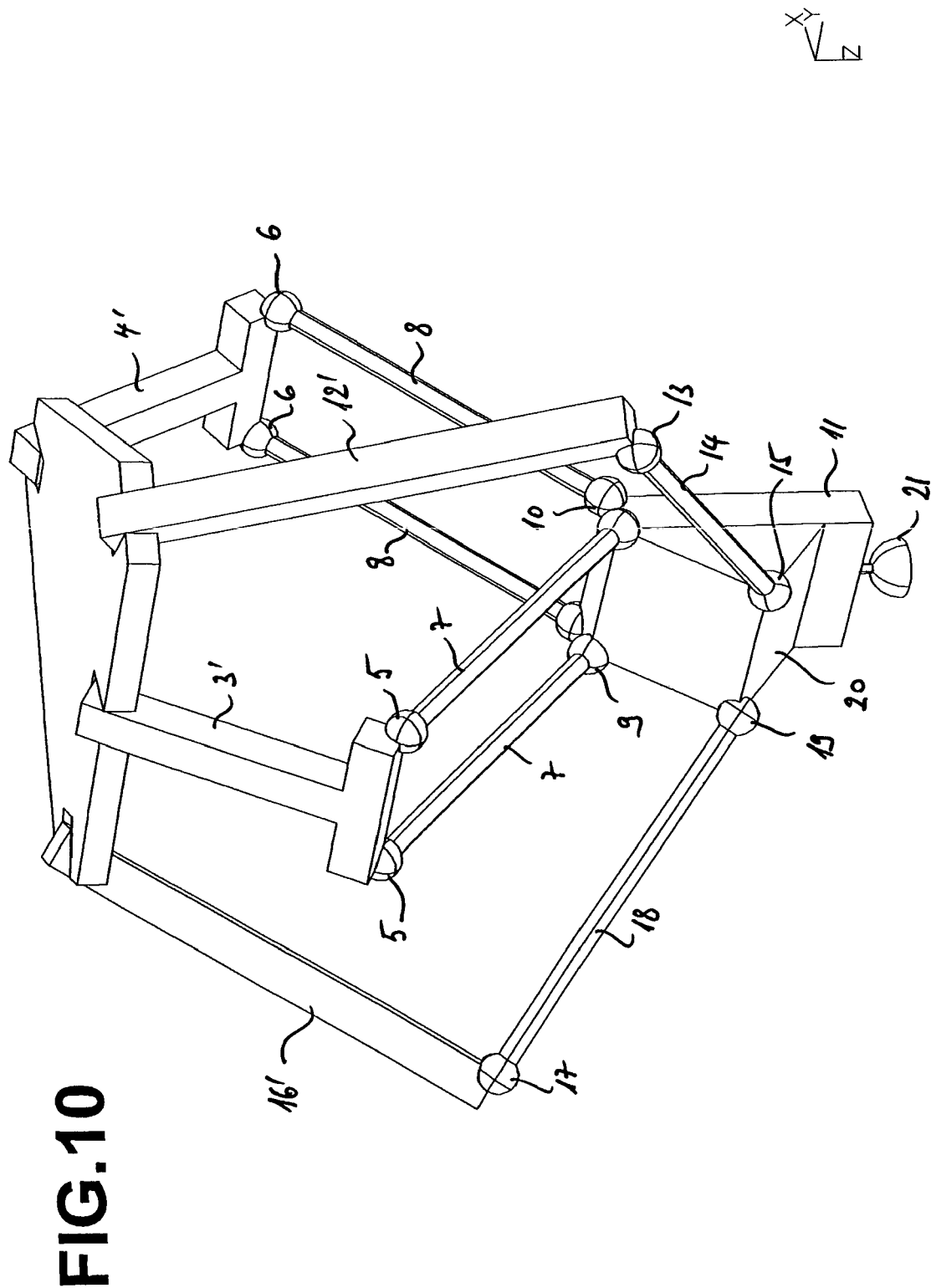
FIG. 10 is an overall perspective view of a second variant of the first embodiment of the device.

By way of example, FIG. 10 shows a second variant of the first embodiment shown in FIG. 1, and in which the slides 2 and 4 are replaced with levers 3' and 4', the slides 12 and 16 being replaced with levers 12' and 16'.

FIG. 2 shows a simplified variant of the auxiliary structure of the first embodiment. In this variant, the motor-driven slides 12' and 16' of the pivot bar 14' and of the side bar 18' are mounted on respective prismatic guides 22 and 23' that are rectilinear, that have one degree of freedom, and that are parallel to the guide 2, i.e. angularly positioned along the x-axis, but raised so as to be situated at some distance along the z-axis relative to the plane of the base 1. These guides 22 and 23' are situated on either side of the vertical plane of symmetry xz of the device. In view of the configuration of the guides 22 and 23', the presence of the element 20 is not necessary to obtain satisfactory angular stiffness tracking, and the ball and socket joints 15' and 19' may be mounted directly on the platform 11, preferably at one of the ends of its top surface. It should be noted that, in this variant, the bars 14' and 18' are both involved in driving the pivoting and in controlling the degree of freedom along the y-axis.

FIG. 3 shows a second embodiment of the device of the invention, with the same diagrammatic view as in FIG. 1. Many of the elements described above can be recognized in FIG. 3, and they are designated by the same references. Thus, FIG. 3 shows the two prismatic guides 2 and 23 that are parallel and angularly positioned along the x-axis, and the two slides 3 and 4 that play the same part as the elements designated by the same references in the first embodiment, i.e. supporting two pairs of support bars 7 and 8 by means of ball and socket joints 5 and 6, each pair of support bars carrying two ball and socket joints 9 or 10 connected as in FIG. 1 to the platform 11 secured to the terminal element 21. The configuration of the "legs" for supporting the platform is the same as in the first embodiment, while the auxiliary structure that controls the two residual degrees of freedom of the terminal element 21 differs from the auxiliary structure in the first embodiment.

As in FIG. 1, the auxiliary structure includes a pivot bar 14 and a side bar 18 mounted on slides 12 and 16 that move respectively along the prismatic guide 2 and along a prismatic guide 23 in a manner identical to the manner described with reference to FIG. 1. In contrast, for controlling the pivoting of the platform, the device of FIG. 3 has three rigid members: namely a pivot plate 29, the drive bar 14, and a control bar 27. The pivot plate 29 is hinged to the platform 11 via a pin of axis 30 parallel to the y-axis. It is shown in the form of a trapezium-shaped element, and its leading edge carries the two ball and socket joints 15 and 19 for hinging the bars 14 and 18, and a third ball and socket joint 28 which is hinged to the control bar 27. The other end of the control bar 27 is mounted via a ball and socket joint 26 on a portion 25 of the slide 3. The location of the ball and socket joint 26 on the slide 3 is not decisive. The ball and socket joint 26 may also be further forwards or further backwards, and higher or lower. Similarly, the centers of the ball and socket joints 28 and 15 may be positioned anywhere within the volume of the pivot plate 29, but they must not be situated on the axis 30.

The side bar 18 does not necessarily have to be connected to the pivot plate, but rather it may be connected to any other element of the driver device, so that movement along the y-axis is obtained.

The terminal element is fixed if the slides 3, 4, 12, and 16 are themselves fixed on their respective prismatic guides, and any movement either in rotation about an axis parallel to 30 or in translation in the workspace may be controlled by acting on the motors that drive said slides.

Figure 4:
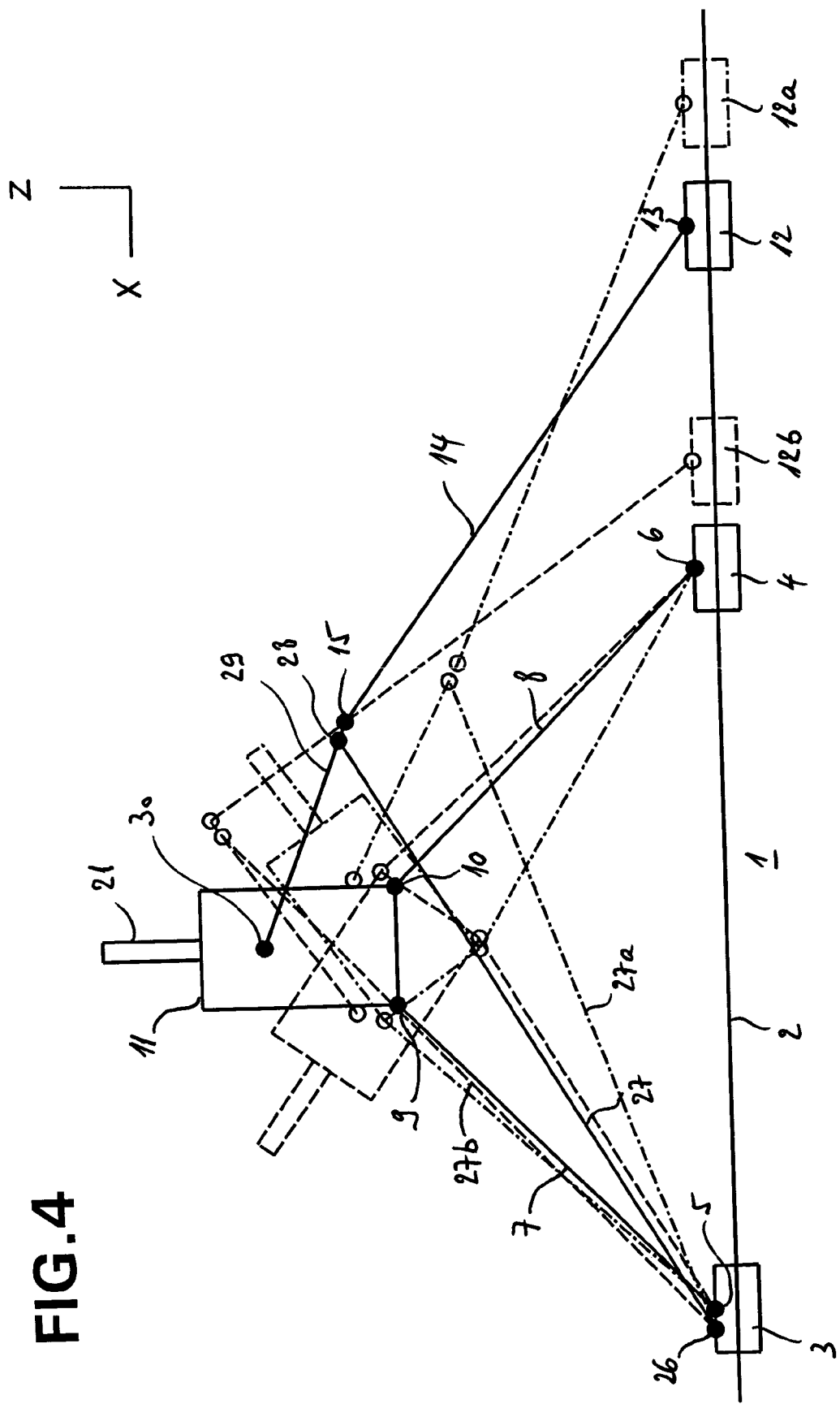

FIGS. 4, 4a, 4b and 4c show a variant without lateral movement of the second embodiment of the device of the invention. It is possible to see the same support structure, with two legs mounted on two slides, and the same auxiliary pivot structure with an intermediate joint, as in the preceding embodiments. Because of the absence of the slide 16 and of the side bar 18, movements along the y-axis are obtained in this example by a relative movement between the device and the means for holding the object on which the terminal element acts. The term "right-handed and left-handed" device may also be used. FIG. 4 gives an illustration of the usable workspace, while FIGS. 4a, 4b and 4c shows respectively the starting position and the two extreme positions of the working element in the usable workspace.

In this example, the base 1 carries a single prismatic guide 2 on which all three slides 3, 4, and 12 are mounted. To avoid any uncontrolled lateral movement of the platform, the two bars of one of the pairs of support bars 7 or 8 must be connected together rigidly, which is the same as replacing, in at least one of the legs, the pair of bars with a single element for which, at least on one of the legs, the ball and socket joints are replaced with pivots having axes parallel to the axis 30. Other configurations having two pivots may also be devised.

The auxiliary structure, which pivots the platform 11 secured to the terminal element 21 about the joints 9 and 10, includes the pin 30 and the pivot plate 29 on the leading edge of which are mounted the intermediate joints 28 and 15 connecting the plate 29 to the control bar 27 and to the pivot drive bar 14, which itself bears on the joint 13 of the slide 12. The joints 9 and 10 may be combined so that their axes coincide. The same applies to the joints 15 and 28.

FIG. 4 shows in dashed lines the extent of the angular movement that the auxiliary structure can impart to the platform 11 merely by moving the slide 12 between the two end positions 12a and 12b represented per se in FIGS. 4b and 4c. The corresponding positions of the control bar 27 are referenced 27a and 27b.

Figure 5:
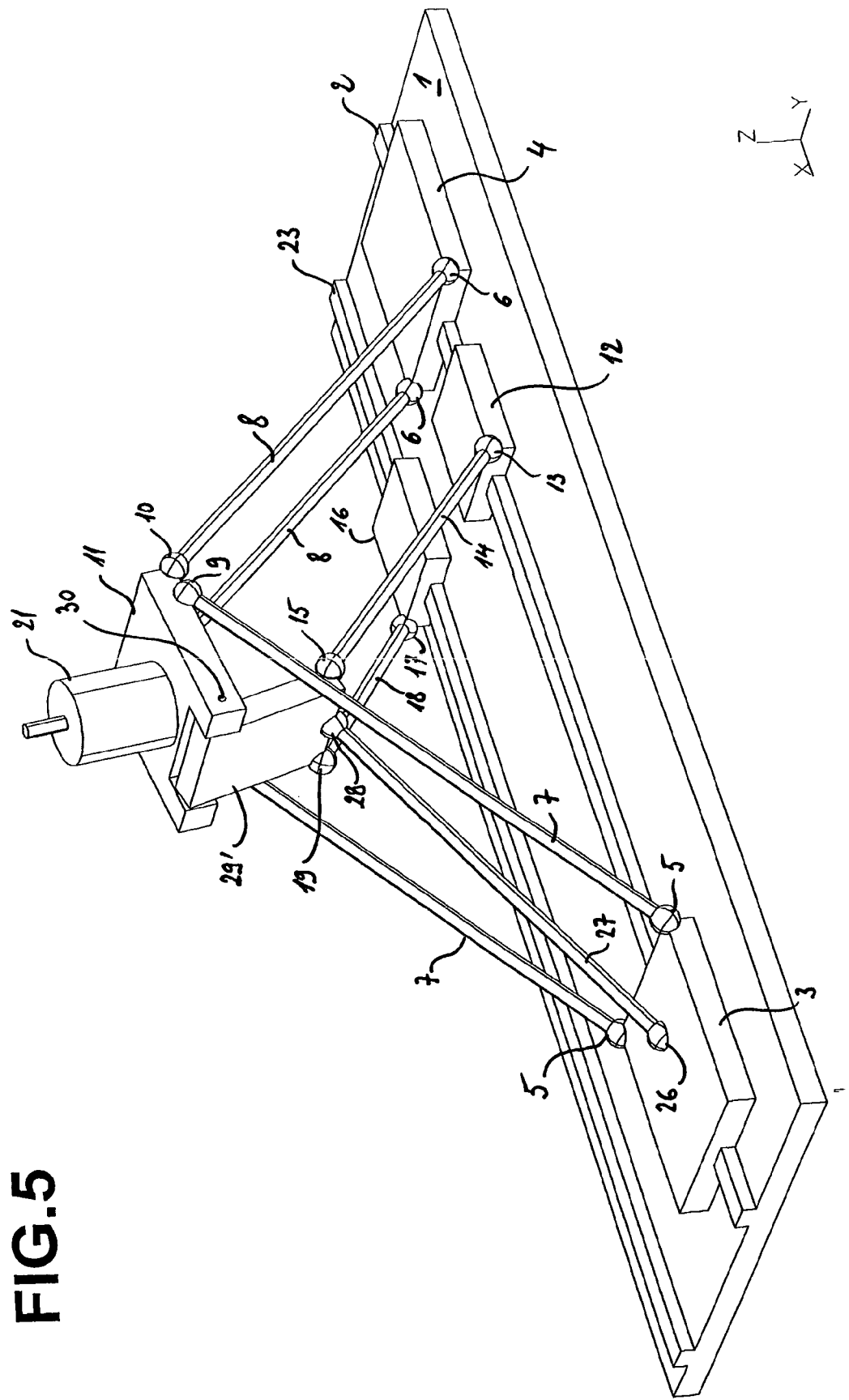
FIG. 5 is an overall perspective view of a third embodiment.

The third embodiment, shown in FIG. 5, differs from the embodiment shown in FIG. 3 firstly by the configuration of the pivot plate 29' which, when the slide 12 is moved in the same direction, causes an opposite movement of the platform compared with the movement of the platform of the device of FIG. 3. In some cases, this configuration makes it possible to obtain particularly advantageous operating conditions.

In this example too, the terminal element 21 is secured rigidly to the platform 11, and all of the joints are of the ball and socket joint type, except for the (simple) joint 30 via which the pivot plate 29' is hinged to the platform, which joint is angularly positioned along the y-axis.

In this example too; the base plate 1 carries the two parallel prismatic guides 2 and 23. The two slides 3 and 4 which act in exactly the same way as the slides 3 and 4 in FIG. 3 are mounted on the prismatic guide 2. Via ball and socket joints 5, 6, they carry pairs of support bars 7, 8 forming two parallelograms and defining two support legs for supporting the platform 11. As in FIG. 3, the locations of the ball and socket joints on the pivot plate 29' is not decisive, provided that they are not situated on the axis 30. An auxiliary structure with two rigid members and an intermediate joint is also to be found in this example. However, the assembly is organized so that the pivot movement of the platform 11 takes place in the direction opposite to the direction in which the platform of the device shown in FIG. 3 pivots. In this case, the slide 12 is mounted on the guide 2 so as to move between the slides 3 and 4, the configuration of the pivot plate 29' and of the pivot bar 14, of the side bar 18 and of the control bar 27 being chosen so that the pivot plate can pivot between the support bars 7.

Figure 6:
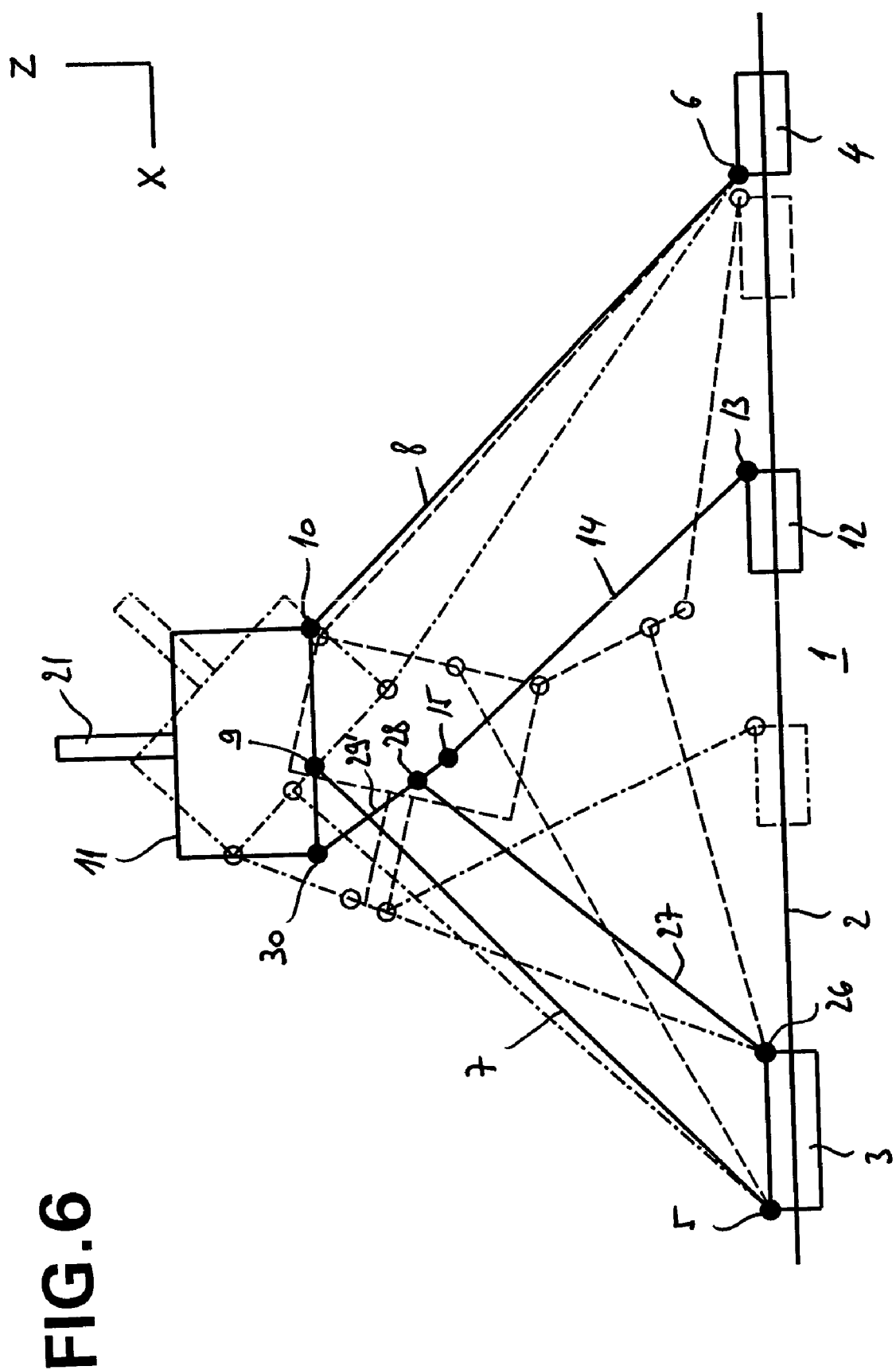
FIGS. 6, 6a, 6b and 6c are elevation views of the third embodiment.
Figure 6C:
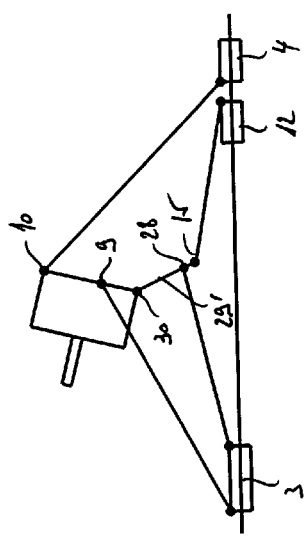
Figure 6A:
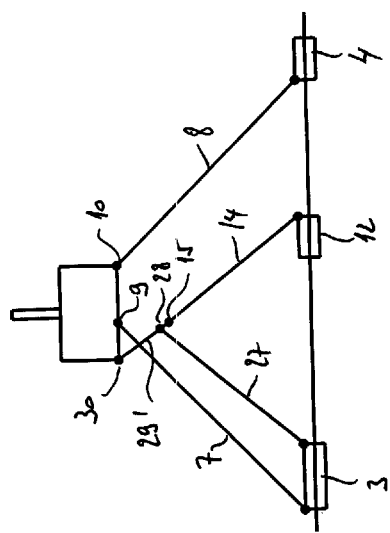
Figure 6B:
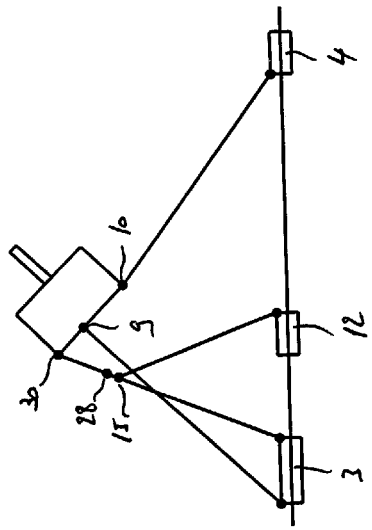

A variant without lateral movement of the device of FIG. 5 is shown in FIGS. 6, 6a 6b and 6c. This device can in fact be considered to be the reverse of the device shown in FIG. 4, in that the only difference relative to the device having three degrees of freedom shown in FIGS. 4, 4a, 4b and 4c lies in the position of the joint 30 on the platform compared with the pivot joints 9 and 10. The variant of FIG. 6 gives an illustration of an oversimplified device, in which, in particular, the positions of joints 9 and 10 are voluntarily abnormally distant from each other, in order to better emphazise the connection of the elements on the auxiliary structure. In reality, these joints will be chosen closer from each other to obtain better results.

It should be noted that in all of the examples shown in FIGS. 3 to 6, the ball and socket joint 15 could also be fixed to the bar 27, provided that it does not coincide with the ball and socket joint 26, or to the bar 18, provided that it does not coincide with the ball and socket joint 17, or the ball and socket joint 28 could be fixed to the bar 14, provided that it does not coincide with the ball and socket joint 13, or to the bar 27, provided that it does not coincide with the ball and socket joint 26.

Similarly, the ball and socket joint 19 may be fixed to the bar 14, provided that it does not coincide with the ball and socket joint 13, or to the bar 27, provided that it does not coincide with the ball and socket joint 26.

Finally, the ball and socket joints 9 may be fixed to the bars 8, provided that they do not coincide with the ball and socket joints 6, or the ball and socket joints 10 may be mounted on the bars 7, provided they do not coincide with the ball and socket joints 5.

Figure 8:
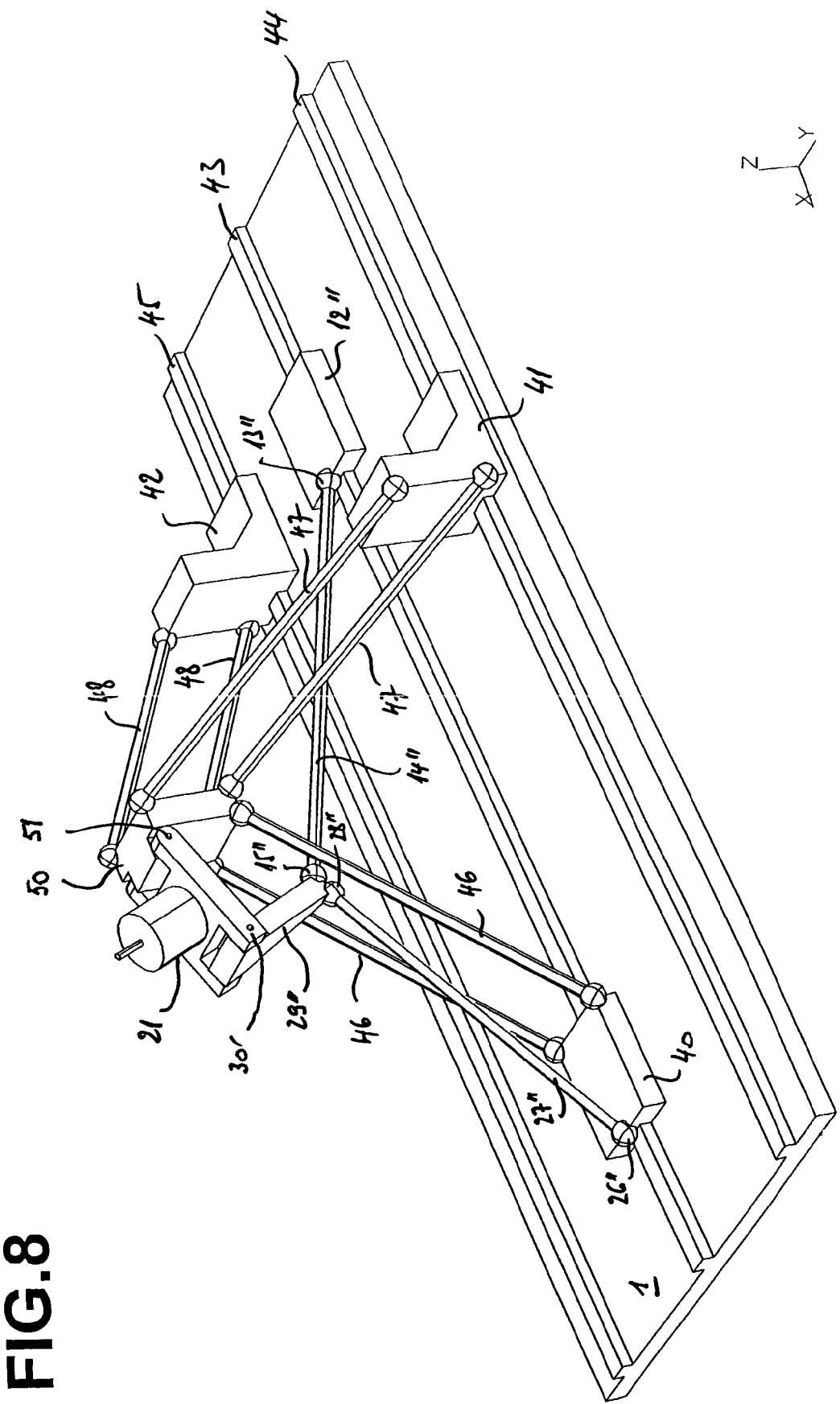
FIG. 8 is an overall perspective view of a variant of the fourth embodiment.

Whereas in all of the examples described above, the terminal element is secured rigidly to the platform, FIGS. 7 and 8 show two examples of a fourth embodiment of the device of the invention, in which the terminal element 21 is not rigidly constrained to move with the platform designated by 50. The structure for supporting and moving the platform is, in these two examples, a structure of the type described in Patents EP 0250470 and U.S. Pat. No. 4,976,582, i.e. a structure in which the three basic degrees of freedom of the platform are effected in parallel on the basis of three motor-driven slides 40, 41, and 42 moving along respective ones of three parallel prismatic guides 43, 44, and 45, and each actuating a respective leg 46, 47, and 48 supporting the platform 50 so as to keep the parallelism of the platform relative to the base 1. Each of the three legs of the structure described is formed by a pair of support bars 46, 47, 48 hinged via ball and socket joints to the slides that carry them and on one side of the platform. The structure thus has three deformable parallelograms which hold the platform parallel to the base and make it possible to drive the movements in translation of the platform throughout the workspace provided In this example, the terminal element 21 is hinged to the platform in a manner such as to pivot about an axis 51 associated with the platform.

The auxiliary structure that makes it possible to cause the terminal element 21 to pivot in controlled manner about the axis 51 comprises a pivot plate 29" pivotally mounted at one of its ends on the terminal element 21 to pivot about an axis 30', and co-operating with a pivot bar 14" and with a control bar 27". The pivot bar 14" is hinged at one of its ends to a motor-driven slide 12" that can move along a prismatic guide 43 and is hinged at its other end to the pivot plate 29". The control bar 27" is hinged at one of its ends 26" to the slide 40 and is hinged at its other end to the plate 50, at a place that does not coincide with the axis 30'. In a variant, the joint 26" could also be mounted on the platform 50 at a place that does not coincide with the axis 51.

The two variants shown in FIGS. 7 and 8 differ in that their configurations of the pivot plate 29" cause pivot movements of the terminal element 21 that are opposite when the slide 12" is moved in the same direction.

As in the other embodiments described, the slides 40, 41, and 42 could be replaced by pivotally mounted levers, it being necessary for the pivot axes of the levers in this example to be parallel to the respective axes passing through the centers of the ball and socket joints mounted at the bases of the legs 46, 47, and 48. The slide 12" may be replaced with a lever mounted to pivot about an axis positioned in any way.

It should be noted that in the examples shown in FIGS. 7 and 8, the ball and socket joint 15" could also be fixed to the bar 27", provided that it does not coincide with the ball and socket joint 26", or the ball and socket joint 28" could be fixed to the bar 14", provided that it does not coincide with the ball and socket joint 13".

Figure 9:
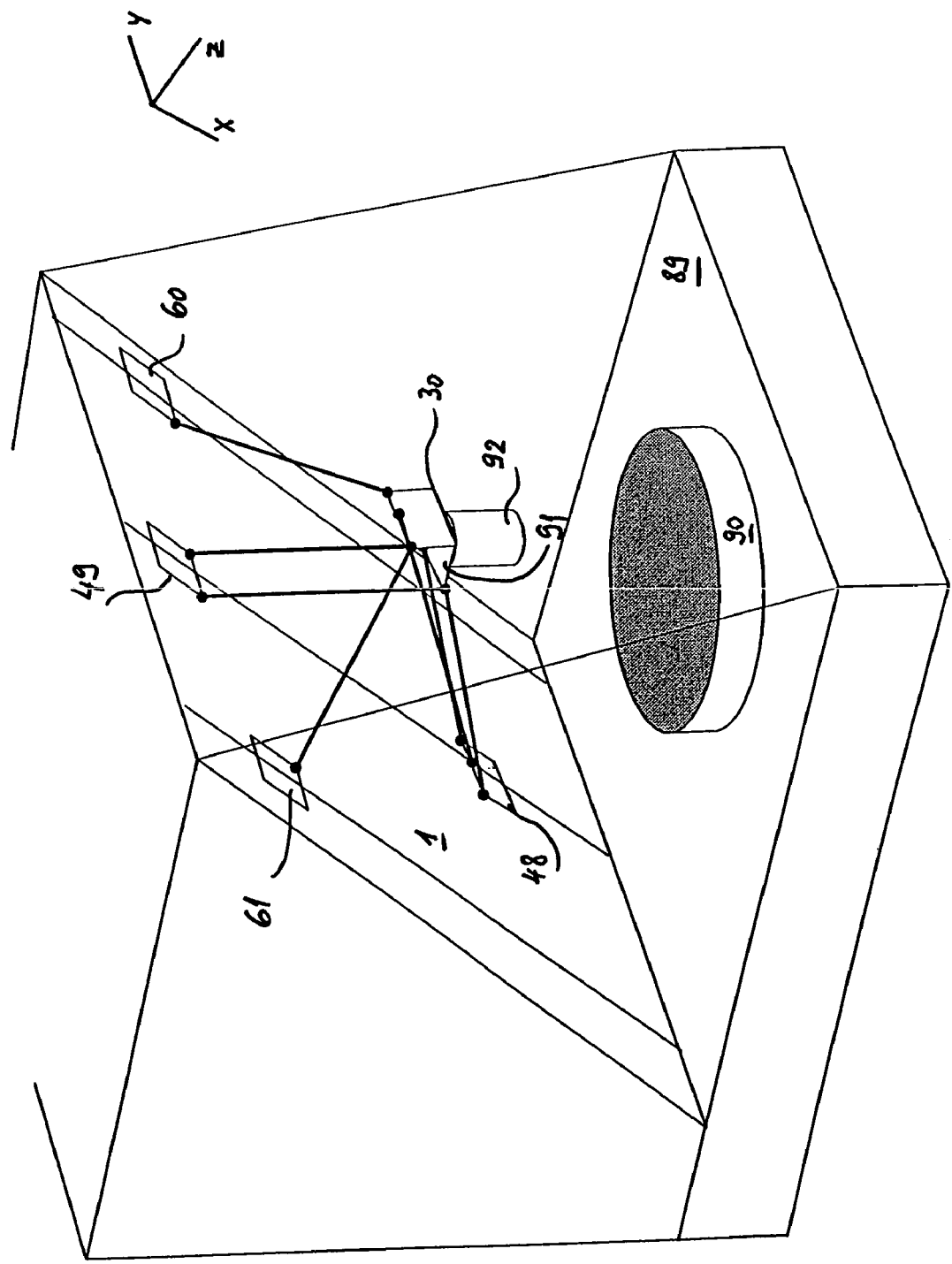
FIG. 9 is a perspective view of use of a variant of the second embodiment in a machine tool.

FIG. 9 remains to be described. FIG. 9 shows an example of use of the device of the invention in a machine tool. The embodiment chosen to show this use is similar to the embodiment shown in FIG. 3, except that the slides 60 and 61, corresponding to the slides 12 and 16 of the device in FIG. 2, are guided on separate prismatic guides that are parallel to the x-axis. The slides 48 and 49 correspond to the slides 3 and 4 of the device of the FIG. 3.

The base 1 is a plate that is inclined, e.g. at 45° above the worktable 89 which is provided with a turntable 90 whose axis is vertical, for example. The turntable is designed to receive a workpiece on which the tool of the terminal element 92 which is secured to the platform 91 can perform various machining operations. It is also possible to consider equipping the terminal element 92 with a workpiece carrier that is optionally driven, and replacing the turntable with one or more motor-driven or passive tools, or a combination of both types of tool, and performing the machining by moving the workpiece past the tools.

In general, it is possible to add a second bar to each single bar, e.g. 14, 18, 27, the second bar being parallel to the single bar and working identically to it. This makes it possible to improve the stability of the device and to increase its rigidity. The negative effects of the resulting hyper-guiding can be removed to a large extent by known solutions, such as implementing high precision or inserting a balancing lever.

The invention claimed is:

1. A kinematic device for supporting and programmably moving a terminal element in a machine or an instrument, said device comprising a fixed base defining a reference plane, a support and drive structure arranged for moving said terminal element at will within a predetermined workspace, said structure comprising at least two carriages guided on said base for moving with only one degree of freedom defining an x-axis of said workspace, at least two rigid legs of definite length, a platform bearing said terminal element, a support and drive joint arrangement connecting each of the carriages to one end of one of the legs and the other end of the legs to the platform, and an auxiliary structure for imparting to the terminal element a pivoting movement about a pivot axis belonging to the platform that displaces the pivot axis parallel to its previous position, with y orientation perpendicular to said x-axis, comprising an auxiliary carriage guided on said base for moving with only one degree of freedom, an auxiliary rigid pivot bar of fixed length, a joint connecting one end of the pivot bar to the auxiliary carriage, and a transmission structure between the other end of the pivot bar and the platform, with a transmission joint on said transmission structure, for transmitting to the terminal element a resultant force in response to a displacement of said auxiliary carriage, the arrangement of said transmission structure and the location of said transmission joint with respect to the platform being such that the direction of the resultant force at the transmission joint remains close to a perpendicular to the line joining the transmission joint to the pivot axis for all positions of the terminal element within the workspace, whereby said terminal element is subjected to a usable torque throughout the workspace, regardless of the position of the terminal element within said workspace, wherein in said support and drive structure said at least two carriages consist of two support slides and of a further side slide, said slides moving on guiding means integral with said base and having a same orientation which defines said x-axis of said workspace, wherein said at least two legs consist of two pairs of parallel rigid bars of definite length, each pair joining one of the support slides to the platform and of a further side bar extending between the side slide and the transmission structure, and wherein said support and drive joint arrangement comprises eight joints, four of which connect the pairs of parallel support bars to the support slides, the other four joints connecting the pairs of bars to the platform and having locations on the platform defining two parallel lines with said y orientation in the workspace, the said pivot axis being determined by the instantaneous intersection between two planes formed respectively by the axes of the said pairs of support bars.

2. A kinematic device for supporting and programmably moving a terminal element in a machine or an instrument, said device comprising a fixed base defining a reference plane, a support and drive structure arranged for moving said terminal element at will within a predetermined workspace, said structure comprising at least two carriages guided on said base for moving with only one degree of freedom, at least two rigid legs of definite length, a platform bearing said terminal element, a support and drive joint arrangement connecting each of the carriages to one end of one of the legs and the other end of the legs to the platform, and an auxiliary structure for imparting to the terminal element a pivoting movement about a pivot axis belonging to the platform that displaces the pivot axis parallel to its previous position, comprising an auxiliary carriage guided on said base for moving with only one degree of freedom, an auxiliary rigid pivot bar of fixed length, a joint connecting one end of the pivot bar to the auxiliary carriage, and a transmission structure between the other end of the pivot bar and the platform, with a transmission joint on said transmission structure, for transmitting to the terminal element a resultant force in response to a displacement of said auxiliary carriage, the arrangement of said transmission structure and the location of said transmission joint with respect to the platform being such that the direction of the resultant force at the transmission joint remains close to a perpendicular to the line joining the transmission joint to the pivot axis for all positions of the terminal element within the workspace, wherein in said support and drive structure said at least two carriages consist of two support slides and of a further side slide, said slides moving on guiding means integral with said base and having a same orientation which defines an x-axis of said workspace, wherein said at least two legs consist of two pairs of parallel rigid bars of definite length, each pair joining one of the support slides to the platform and of a further side bar extending between the side slide and the transmission structure, and wherein said support and drive joint arrangement comprises eight joints, four of which connect the pairs of parallel support bars to the support slides, the other four joints connecting the pairs of bars to the platform and having locations on the platform defining two parallel lines with an y orientation in the workspace, the said pivot axis being determined by the instantaneous intersection between two planes formed respectively by the axes of the said pairs of support bars, and wherein said platform and said terminal element are secured together to form a single rigid body and wherein the transmission structure comprises a pivot plate hinged to said body through a pair of coaxial joints having the said y orientation and forming the said transmission joint, a control bar connected at one end through a joint to one of the support slides, and at the other end to the pivot plate, and joints connecting the other ends of the pivot bar and of the side bar respectively to the pivot plate.

* * * * *